(12) United States Patent
Ejiri et al.

(10) Patent No.: US 6,835,438 B2
(45) Date of Patent: Dec. 28, 2004

(54) MAGNETIC RECORDING TAPE

(75) Inventors: Kiyomi Ejiri, Kanagawa (JP); Noriko Inoue, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 24 days.

(21) Appl. No.: 10/462,713

(22) Filed: Jun. 17, 2003

(65) Prior Publication Data

US 2004/0214046 A1 Oct. 28, 2004

(30) Foreign Application Priority Data

Jun. 18, 2002 (JP) ..................................... P. 2002-177338

(51) Int. Cl.⁷ ............................................. G11B 5/735
(52) U.S. Cl. ............................... 428/141; 428/694 BB; 428/323
(58) Field of Search ............................. 428/141, 323, 428/694 BB

(56) References Cited

U.S. PATENT DOCUMENTS 5,783,296 A * 7/1998 Tamazaki et al. ........... 428/216
6,767,610 B2 * 7/2004 Takahashi et al. .......... 428/141

FOREIGN PATENT DOCUMENTS

JP 11-259851 A 9/1999

* cited by examiner

*Primary Examiner*—Stevan A. Resan
(74) *Attorney, Agent, or Firm*—Sughrue Mion, PLLC

(57) ABSTRACT

A magnetic recording tape comprising a magnetic layer, a flexible support and a backcoating layer in this order, wherein the backcoating layer has on its surface 10 to 200 projections having a height of 50 to 100 nm per 90 μm side square as measured with an atomic force microscope and 10 or fewer projections having a height greater than 100 nm and not greater than 500 nm per 90 μm side square as measured with an atomic force microscope, and the tape has a cupping of 3 to 20% of the tape width with convexity on the magnetic layer side.

14 Claims, 1 Drawing Sheet

MAGNETIC RECORDING TAPE

FIELD OF THE INVENTION

This invention relates to a high-density magnetic recording tape excellent in electromagnetic characteristics and running durability.

BACKGROUND OF THE INVENTION

Magnetic recording media are widely used for recording all kinds of information including sound data, image data, and literal data. The recent innovation of technology has increased data storage capacity and data transfer rate and thus boosted the need for high-density recording. With this trend, magnetic recording media having high electromagnetic characteristics have been demanded. High reliability in repeated use of data and for data storage is also demanded. Accordingly, magnetic recording media are required to have satisfactory running durability as well as excellent electromagnetic characteristics. It is known that running durability of a magnetic tape media can be improved by properly designing a backcoating layer. Included among such attempts are roughening the surface of a backcoating layer by providing projections or adding coarse carbon particles of 0.1 $\mu$m or greater. However, when a magnetic recording tape having a backcoating layer with such surface roughness is stored or handled for processing in form of a tape pack wound on a hub, the roughness can imprint itself in the magnetic layer under tape pack stresses, which can result in deteriorated electromagnetic characteristics. To overcome the roughness imprint problem, it has been attempted to smoothen the backcoating layer surface, but back side smoothening often causes poor tape pack wind quality. That is, entrapped air hardly escapes on tape winding, which can result in irregularities of a tape pack, such as popped strands of tape protruding from the edge of a pack.

The recent computer storage tape media are required to reduce in thickness for increasing recording capacity. Thickness reduction is achieved by, for example, reducing the thickness of a flexible support or the thickness of a non-magnetic layer provided in a particulate magnetic recording tape between a flexible support and a magnetic layer. When a pack of tape with an extremely thin flexible support has a poor wind quality with popped strands, the strands that stick out of the pack edge can be bent during storage, or the tape pack undergoes winding defects, such as cinching and spoking, which will lead to increased errors.

As an approach to improve electromagnetic characteristic by smoothening a backcoating layer to prevent roughness imprints, JP-A-11-259851 discloses a magnetic tape medium having a backcoating layer mainly comprising particulate titanium oxide and carbon black. Whereas the technique brings about improved back side smoothness and reduction of roughness imprints, the tape has a poor wind quality, and an increased error rate results after storage.

Hence, the related techniques have not provided a magnetic recording tape satisfactory in both electromagnetic characteristics and wind quality. Considering the increasing demand for further reduction in tape thickness, the state-of-the-art magnetic recording tapes are still unsatisfactory in electromagnetic characteristics and wind quality.

SUMMARY OF THE INVENTION

An object of the present invention is to provide a magnetic recording medium for high density recording which is substantially free from the roughness imprint problem and has excellent electromagnetic characteristics and a good wind quality.

As a result of extensive investigations, the inventors have found that a magnetic recording tape having a controlled surface roughness on its backcoating layer side and a moderate cupping satisfies both electromagnetic characteristics and tape wind quality.

The present invention provides a magnetic recording tape comprising a flexible support, a magnetic layer provided on one side of the support, and a backcoating layer on the other side of the support, wherein the backcoating layer has on its surface 10 to 200 projections having a height of 50 to 100 nm per 90 $\mu$m side square as measured with an atomic force microscope (AFM) and 10 or fewer projections having a height greater than 100 nm and not greater than 500 nm per 90 $\mu$m side square as measured with an AMF and the tape has a cupping of 3 to 20% of the tape width with convexity on the magnetic layer side. The cupping with convexity on the magnetic layer side will hereinafter be referred to as outward cupping.

DETAILED DESCRIPTION OF THE INVENTION

Figure 1:
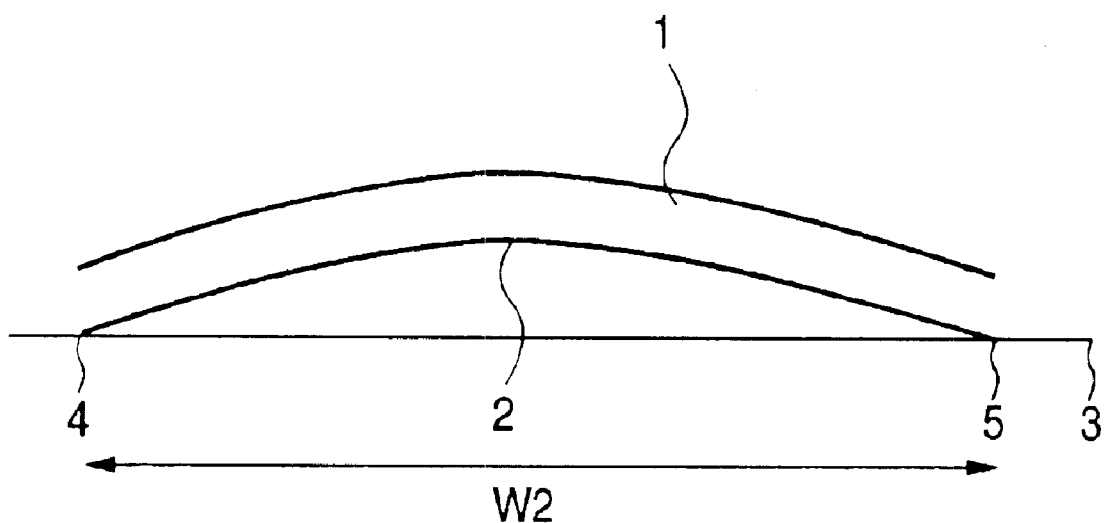
FIG. 1 a cross-section of a tape across the longitudinal direction of the tape.

The surface roughness of the backcoating layer can be controlled by properly selecting the physical properties, shape, size, and amount of particles, the kind of the binder, and other factors as will be discussed in detail.

The terminology "cupping" of a magnetic recording tape with convexity on the magnetic layer side, namely "outward cupping", has the following meaning. Reference is made to FIG. 1, a cross-section of a tape across the longitudinal direction of the tape. An arbitrary length is cut out of a magnetic recording tape product in a cassette, etc. at right angles with the length of the tape. The cut piece 1 is placed on a flat surface with its back side 2 down and with no tension applied. When the tape has outward cupping, the cut piece 1 shows curvature in the lateral direction with its magnetic layer side protruding upward. That is, the cut piece 1 is placed on the flat surface on its lateral edges 4 and 5 but not on its back side. The cupping is quantitatively represented by formula:

$$\text{Cupping}=(W2/2)\tan(S^{1/2})$$

where W2 is a distance between lateral edges 4 and 5 measured on the flat plane; and S is 10×(1−(1.2W2/W1−0.2)$^{1/2}$), in which W1 is the tape width measured with a slide glass put on the cut piece having outward (upward in FIG. 1) cupping.

In the present invention, the cupping as calculated according to the above formula is controlled within a range of from 3 to 20%, preferably 4 to 15%, over the total length of the tape pack.

The cupping can be controlled through various methods. Among them is a method in which a binder to be used in the backcoating layer is properly selected, and a magnetic recording tape wound around a hub is subjected to heat treatment. According to this method, the degree of cupping can be adjusted as designed by selecting the kind and amount of a binder, heat treating conditions, and the like. For instance, outward cupping of a tape is induced by using nitrocellulose, polyurethane or polyisocyanate as a binder of a backcoating layer and treating the tape at 40 to 80° C. for 6 to 72 hours, preferably at 50 to 70° C. for 12 to 48 hours.

With the tape cupping falling within the above-specified range, the tape can be wound into a neat pack while letting entrapped air easily escape in the tape lateral direction. If the cupping is out of the range, the wind quality is not improved, resulting in a failure to improve electromagnetic characteristics. Excessive cupping results in insufficient contact of the tape with a magnetic head, resulting in deterioration of electromagnetic characteristics.

The magnetic recording tape of the present invention embraces a wide range of products comprising a flexible support, a magnetic layer on one side of the support, and a backcoating layer on the other side of the support. The magnetic recording tape of the invention may comprise additional layers, such as a non-magnetic layer containing non-magnetic powder, a soft magnetic layer containing soft magnetic powder, a second magnetic layer, a cushioning layer, an overcoating layer, an adhesive layer, and a protective layer. These optional layers are provided at an appropriate position in the tape thickness direction where their function is effectively displayed.

A preferred layer structure of the magnetic recording tape of the invention has a non-magnetic layer containing a non-magnetic inorganic powder and a binder between the flexible support and the magnetic layer. In this configuration, a preferred thickness of the magnetic layer is usually 0.01 to 1 μm, preferably 0.03 to 0.5 μm, still preferably 0.03 to 0.2 μm, and a preferred thickness of the non-magnetic layer is usually 0.5 to 3 μm, preferably 0.8 to 3 μm. It is preferred for the non-magnetic layer be thicker than the magnetic layer.

A layer structure having two magnetic layers is also preferred. The upper magnetic layer usually has a thickness of 0.2 to 2 μm, preferably 0.2 to 1.5 μm, and the lower magnetic layer usually has a thickness of 0.8 to 3 μm. In a layer structure having a single magnetic layer, the thickness of the magnetic layer is usually 0.1 to 5 μm, preferably 0.1 to 3 μm, still preferably 0.1 to 1.5 μm. Where a soft magnetic layer is present between the flexible support and the magnetic layer, the magnetic layer usually has a thickness of 0.03 to 1 μm, preferably 0.05 to 0.5 μm, and the soft magnetic layer usually has a thickness of 0.8 to 3 μm.

The magnetic layer may be a particulate one in which ferromagnetic powder is dispersed in a binder or a metal-evaporated one prepared by vacuum evaporation or sputtering. A metal-evaporated magnetic layer is usually formed to a deposit thickness of 0.05 to 0.3 μm, preferably 0.1 to 0.2 μm.

The backcoating layer of the magnetic recording tape of the invention usually has a thickness of 0.05 to 1.0 μm, preferably 0.1 to 0.8 μm, still preferably 0.2 to 0.6 μm.

The backcoating layer comprises a non-magnetic powder dispersed in a binder. Non-magnetic powders include carbon black, fine metal powders, organic fillers, and metal oxides. Metal oxides are preferred for their chemical stability and dispersibility. Carbon black is preferred for the purpose of imparting electrical conductivity. A combination of a metal oxide and carbon black is preferably used. The metal oxides include titanium oxide, α-iron oxide, goethite, $SiO_2$, $SnO_2$, $WO_3$, $Al_2O_3$, $ZrO_2$, and ZnO. The particle size ranges usually 5 to 100 nm, preferably 10 to 70 nm. In particular, needle-like (acicular) particles usually have a longer axis length of 50 to 500 nm, preferably 50 to 400 nm, still preferably 70 to 300 nm. Tabular particles usually have an average maximum diameter of 50 to 2000 nm, preferably 50 to 1000 nm.

Carbon black added to impart conductivity usually has an average particle size of 50 nm or smaller, preferably 10 to 40 nm. When carbon black is used in combination with a metal oxide, a preferred weight ratio of oxide to carbon is 60:40 to 90:10, particularly 70:30 to 90:10. The term "average particle size" as used herein means an arithmetic mean of particle sizes of primary particles free of aggregation. Carbon black particles having an average particle size greater than 50 nm do not aggregate into what we call a high structure enough to develop electrical conductivity. Carbon black having an average particle size smaller than 10 nm heavily aggregates into projections on the backcoating layer surface which tends to remarkably affect the magnetic layer under tape pack stresses.

It is preferred for the backcoating layer to contain carbon black having an average particle size of 80 nm or greater as a solid lubricant. Carbon black as a solid lubricant is added in an amount of 0.1 to 10 parts, preferably 0.3 to 5 parts, per 100 parts by weight of the total of the oxide and carbon black added for electrical conductivity development. Addition of too much carbon black of this size results in increased projections on the backcoating layer surface, which will remarkably influence the magnetic layer by roughness imprinting.

The carbon blacks to be added preferably has a pH of 2 to 10, a water content of 0.1 to 10% by weight, and a tap density of 0.1 to 1 g/ml. The carbon black having an average particle size of 50 nm or smaller usually has a specific surface area of 100 to 500 $m^2$/g, preferably 150 to 400 $m^2$/g, and a DBP (dibutyl phthalate) oil absorption of 20 to 400 ml/100 g, preferably 30 to 200 ml/100 g. Examples of commercially available carbon blacks having an average particle size of 50 nm or smaller include Black Pearls 2000, 1300, 1000, 900, 800, 880, and 700 and VulcanXC-72 from Cabot Corp.; #3050B, #3150B, #3250B, #3750B, #3950B, #950, #650B, #9708, #850B, and MA-600 from Mitsubishi Chemical Corp.; Conductex SC and RAVEN 8800, 8000, 7000, 5750, 5250, 3500, 2100, 2000, 1800, 1500, 1255, and 1250 from Columbian Carbon; and Ketjen Black EC from Akzo Nobel Chemicals. The carbon black having an average particle size of 80 nm or greater usually has a specific surface area of 5 to 100 $m^2$/g, preferably 5 to 30 $m^2$/g, and a DBP oil absorption of 20 to 120 ml/100 g, preferably 30 to 110 ml/100 g. Examples of useful commercially available carbon blacks of this size include #55, #50, and #30 from Asahi Carbon Co.; Raven 450 and 430 from Columbian Carbon; and Thermax MT from Cancarb Ltd.

Known binders can be used in the backcoating layer. Useful binders include thermoplastic resins, thermosetting resins, and reactive resins. Suitable binders include chlorine-free ones, such as cellulosic resins, e.g., nitrocellulose, phenoxy resins, and polyurethane resins. Polyurethane resins having a glass transition point (Tg) of 80 to 140° C. are preferred from the standpoint of improved storage stability. Particularly preferred are those which are obtained by the reaction between a diol and an organic diisocyanate and contain 17 to 40% by weight of a short-chain diol having a cyclic structure and 10 to 50% by weight of a long-chain diol having an ether linkage, each based on the polyurethane resin, the ether linkage content in the long-chain diol being 1.0 to 5.0 mmol/g based on the polyurethane resin. Polyurethane resins of this kind will be described in greater detail.

The short-chain diol has a molecular weight of 50 and more and less than 500, preferably 100 to 300. Examples of the short-chain diol include aromatic or alicyclic ones, such as cyclohexane-1,4-diol, cyclohexane-1,4-dimethanol, bisphenol A, hydrogenated bisphenol A, bisphenol S, and bisphenol P, ethylene oxide- or propylene oxide-adducts of these bisphenols, cyclohexanedimethanol (e.g., cyclohexane-1,4-dimethanol), and cyclohexanediol (e.g., cyclohexane-1,4-diol). The long-chain diol has a molecular weight of 500 to 5000. Examples are an ethylene oxide adduct and a propylene oxide adduct of bisphenol A or hydrogenated bisphenol A. Preferred short-chain and long-chain diols are those represented by formula (I):

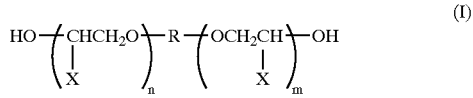

(I)

wherein R represents a residue of bisphenol A, hydrogenated bisphenol A, etc.; X preferably represents a hydrogen atom or a methyl group, particularly a methyl group; and m and n are numbers selected to give a molecular weight of 50 and more and less than 500 for a short-chain diol or a molecular weight of 500 to 5000 for a long-chain diol.

In formula (I), the numbers m and n is usually 0 to 3 for a short-chain diol and 3 to 24, preferably 3 to 20, still preferably 4 to 15, for a long-chain diol. Diols having too a long chain in which m and n are greater than 24 make the backcoating layer softer, resulting in reduced running durability. The nX's or mX'S in the parentheses do not always need to be the same.

Of the short-chain dials represented by formula (I) preferred are those in which R is bisphenol A, an ethylene oxide or propylene oxide adduct thereof, hydrogenated bisphenol A, and an ethylene oxide or propylene oxide adduct thereof. Of the long-chain dials represented by formula (I) preferred are those derived from bisphenol A or hydrogenated bisphenol A, particularly a bisphenol A-propylene oxide adduct.

The short-chain diol content in the polyurethane resin is usually 17 to 40% by weight, preferably 20 to 30% by weight, and the long-chain diol content in the polyurethane resin is usually 10 to 50% by weight, preferably 30 to 40% by weight. The ether linkage of the long-chain diol is present in an amount of 1.0 to 5.0 mmol/g, preferably 2.0 to 4.0 mmol/g, based on the polyurethane resin. The polyurethane resin with the recited ether linkage content exhibits excellent adsorptivity for powder, satisfactory ability to disperse powder and excellent solubility in solvents.

Other diols may be used in combination with the short-chain and long-chain diols. Other useful diols include aliphatic ones, such as ethylene glycol, 1,3-propylenediol, 1,2-propylene glycol, 1,4-butanediol, 1,5-pentanediol, 1,6-hexanediol, 2,2-dimethylpropanediol, 1,8-octanediol, 1,9-nonanediol, and diethylene glycol, and an ethylene oxide or propylene oxide adduct of N-diethanolamine.

The organic diisocyanate compound to be reacted with the diols includes aromatic diisocyanates, such as 2,4-tolylene diisocyanate, 2,6-tolylene diisocyanate, xylylene-1,4-diicyanate, xylylene-1,3-diisocyanate, 4,4'-diphenylmethane diisocyanate, 4,4-diphenyl ether diisocyanate, 2-nitrodiphenyl-4,4'-diisocyanate, 2,2'-diphenylpropane-4,4'-diisocyanate, 4,4'-diphenylpropane diisocyanate, m-phenylene diisocyanate, p-phenylene diisocyanate, naphthylene-1,4-diisocyanate, naphthyleen-1,5-diisocyanate, and 3,3'-dimethoxydiphenyl-4,4'-diisocyanate; aliphatic diisocyanates, such as lysine diisocyanate; and alicyclic diisocyanates, such as isophorone diisocyanate, hydrogenated tolylene diisocyanate, and hydrogenated diphenylmethane diisocyanate.

Because the above-described polyurethane resin has a cyclic moiety, the backcoating layer prepared using this as a binder has a high Tg and improved durability. Introduction of a methyl branch ensures solvent solubility and dispersing ability. The Tg of the polyurethane resin is preferably 80 to 140° C., still preferably 90 to 130° C. The binder composition is decided so as to have a Tg of 80 to 140° C., preferably 90 to 130°, whether the cyclic structure of the long-chain diol is aliphatic or aromatic, thereby to improve the film strength and storage stability. The binder of the backcoating layer is usually cured with a polyisocyanate compound as a curing agent. The curing agent is used in an amount of 0 to 150 parts b weight, preferably 0 to 100 parts, still preferably 0 to 50 parts, by weight per 100 parts by weight of the polyurethane resin. The number of hydroxyl groups per molecule of the polyurethane resin is preferably 3 to 20, still preferably 4 or 5. The polyurethane resin containing 2 or fewer hydroxyl groups per molecule has reduced reactivity with the polyisocyanate curing agent to provide a cured film insufficient in film strength and durability. The polyurethane resin containing more than 20 hydroxyl groups per molecule tends to have reduced solvent solubility and reduced dispersing ability. In order to adjust the hydroxyl group content in the polyurethane resin, a polyhydroxy compound having three or more hydroxyl groups can be used. For example, a polyurethane resin prepared by the reaction may be modified with an adequate amount of a tri- or higher functional polyol (e.g., trimethylolethane, trimethylolpropane, glycerol, pentaerythritol or hexanetriol) a tri- or higher functional branched polyester polyol or a tri- or higher functional branched polyether polyol or polyether polyester polyol. The tri- or higher functional branched polyester polyol is synthesized by copolymerizing, as a main component, a diol or a combination of a diol and a dicarboxylic acid with an adequate amount of a tri- or higher functional polyol (such as the one described above) or a tri- or higher functional polycarboxylic acid (e.g., trimellitic anhydride) as disclosed in JP-B-6-64726. The hydroxyl content can also be controlled by using the above-described branched polyol as a starting material of the polyurethane resin. Of the tri- or higher functional compounds preferred are trifunctional ones. Tetra- or higher functional compounds can cause gelation with progress of the reaction.

It is preferred for the polyurethane resin to contain at least one polar group selected from —$SO_3M$, —$OSO_3M$, —$COOM$, —$PO_3MM'$, —$OPO_3MM'$, —$NRR'$, —$N^+RR'R''COO^-$ (wherein M and M' each represent a hydrogen atom, an alkali metal, an alkaline earth metal or ammonium; R and R' each represent an alkyl group having 1 to 12 carbon atoms; and R" represents an N-alkylene group having 1 to 12 carbon atoms), preferably —$SO_3M$ or —$OSO_3M$, per molecule. The content of the polar group is preferably $1\times10^{-5}$ to $2\times10^{-4}$ eq/g, still preferably $5\times10^{-5}$ to $1\times10^{-4}$ eq/g. With a polar group content less than $1\times10^{-5}$ eq/g, the polyurethane resin tends to have insufficient adsorptivity to powder, and reduced dispersing ability may result. With the content exceeding $2\times10^{-4}$ eq/g, the resin tends to have reduced solvent solubility, which also results in reduced dispersing ability.

The polyurethane resin preferably has a number average molecular weight (Mn) of 5000 to 100,000, particularly 10,000 to 50,000, especially 20,000 to 40,000. Molecular weights less than 5000 tend to be insufficient for coating film strength and durability. Molecular weights more than 100,000 tend to have low solvent solubility and low dispersing ability. The cyclic structure of the polyurethane resin contributes to rigidity, and the ether group to flexibility. The above-mentioned polyurethane resin has high solubility, a large gyration radius (spread-outness of molecule), and satisfactory powder dispersing ability. The polyurethane resin itself possesses both hardness (high Tg and high Young's modulus) and toughness (ductility).

The backcoating layer usually contains a lubricant having a melting point of 80° C. or lower, preferably −20 to 80° C., still preferably 0 to 65° C. For example, addition of a fatty acid is effective in controlling an increase of frictional coefficient in repeated running. Useful fatty acids include monobasic fatty acids having 8 to 18 carbon atoms, such as lauric acid, caprylic acid, myristic acid, palmitic acid, stearic acid, oleic acid, linoleic acid, linolenic acid, and elaidic acid. Addition of a fatty acid ester improves scratch resistance in high speed running. Useful fatty acid esters include mono-, di- and triesters between monobasic fatty acids containing 10 to 24 carbon atoms and mono- to hexahydric alcohols containing 2 to 12 carbon atoms. The esters may be saturated or unsaturated and branched or straight. Examples are butyl stearate, octyl stearate, amyl stearate, isooctyl stearate, octyl myristate, butoxyethyl stearate, anhydrosorbitan monostearate, anhydrosorbitan distearate, and anhydrosorbitan tristearate. A preferred amount of the fatty acid or the fatty acid ester to be added is 0.1 to 5 parts by weight, particularly 0.1 to 3 parts by weight, per 100 parts by weight of the total amount of the non-magnetic oxide and the carbon black whose average particle size is 50 nm or smaller.

An aromatic organic acid compound or a titan coupling agent may be incorporated into the backcoating layer to improve the dispersing ability and the film strength thereby controlling a frictional coefficient increase. Incorporation of an organic powder into the backing layer is also effective to suppress an increase in frictional coefficient thereby to reduce roughness transfer to the magnetic layer.

It is preferred for the backcoating layer to further contain abrasive grains having a Mohs hardness of 9 or greater and an average grain size ranging 10 to 40% of the backcoating layer thickness. Presence of such abrasive grains brings about further improvement on running durability. Useful abrasives include α-alumina, chromium oxide, artificial diamond, and cubic boron nitride (CBN). Abrasive grains whose average size is 0.3 µm or smaller and between 10 and 40% of the backcoating layer thickness are preferred. Those having an average grain size smaller than 10% of the backcoating layer thickness would be buried in the backcoating layer to exert insubstantial abrasive effects. Those whose average grain size is greater than 40% of the backcoating layer thickness form increased projections that may imprint themselves in the magnetic layer.

The backcoating layer preferably has a Tg of 80 to 180° C., particularly 90 to 160° C.

The ferromagnetic powder which can be used in the magnetic layer includes ferromagnetic iron oxide powder, Co-doped ferromagnetic iron oxide powder, barium ferrite powder, and ferromagnetic metal powder. The ferromagnetic powder usually has a BET specific surface area $S_{BET}$ of 40 to 80 m$^2$/g, preferably 50 to 70 m$^2$/g, a crystallite size of 12 to 25 nm, preferably. 13 to 22 nm, still preferably 14 to 20 nm, and a particle length of 0.05 to 0.25 µm, preferably 0.07 to 0.2 µm, still preferably 0.08 to 0.15 µm. The pH of the ferromagnetic powder is preferably 7 or higher. The ferromagnetic metal powder includes single metals and alloys, such as Fe, Ni, Fe—Co, Fe—Ni, Co—Ni, and Co—Ni—Fe. The ferromagnetic metal may contain up to 20% by weight, based on the metal component, of aluminum, silicon, sulfur, scandium, titanium, vanadium, chromium, manganese, copper, zinc, yttrium, molybdenum, rhodium, palladium, gold, tin, antimony, boron, barium, tantalum, tungsten, rhenium, silver, lead, phosphorus, lanthanum, cerium, praseodymium, neodymium, tellurium, bismuth, etc. The ferromagnetic metal powder may contain a small amount of water, a hydroxide or an oxide. Processes of preparing these ferromagnetic powders are known, according to which the ferromagnetic powder used in the invention can be prepared. While the shape of the ferromagnetic powder is not limited, acicular, granular, cubic, rice grain-like or tabular particles are usually used. Acicular particles are particularly preferred.

The ferromagnetic powder, the binder, and the curing agent are usually kneaded together with a solvent commonly employed in the art, e.g., methyl ethyl ketone (MEK), dioxane, cyclohexanone or ethyl acetate, in a usual manner to prepare a coating composition for a magnetic layer. The coating composition may additionally contain additives or fillers customarily used in the art, such as abrasives (e.g., a-$Al_{2O3}$ and $Cr_2O_3$), antistatics (e.g., carbon black), lubricants (e.g., fatty acids, fatty acid esters, and silicone oil), and dispersants.

The non-magnetic or magnetic layer which is optionally provided between the magnetic recording layer and the support (hereinafter inclusively referred to as a lower layer) to make a multi-layer structure will then be described. The inorganic powder which can be used in the lower layer may be either of a magnetic substance or a non-magnetic substance. Useful non-magnetic substances include inorganic compounds, such as metal oxides, metal carbonates, metal sulfates, metal nitrides, metal carbides, and metal sulfides; and non-magnetic metals. Examples of the inorganic compounds are titanium oxide ($TiO_2$ or TiO), α-alumina having an α-phase content of 90 to 100%, β-alumina, γ-alumina, α-iron oxide, chromium oxide, zinc oxide, tin oxide, tungsten oxide, vanadium oxide, silicon carbide, cerium oxide, corundum, silicon nitride, titanium carbide, silicon dioxide, magnesium oxide, zirconium oxide, boron nitride, calcium carbonate, calcium sulfate, barium sulfate, molybdenum disulfide, goethite, aluminum hydroxide, and mixtures of two or more thereof. Preferred of them are titanium dioxide, zinc oxide, iron oxide, and barium sulfate. Still preferred are titanium dioxide described in JP-A-5-182177 and a-iron oxide described in JP-A-6-60362 and JP-A-9-170003. Examples of the non-magnetic metals are Cu, Ti, Zn, and Al.

The non-magnetic powder preferably has an average particle size of 0.005 to 2 µm. If desired, non-magnetic powders different in particle size may be used in combination, or a single kind of a non-magnetic powder having a broadened size distribution may be used to produce the same effect. A still preferred average particle size of the non-magnetic powder is 0.01 to 0.2 µm. The non-magnetic powder preferably has a pH of 6 to 9 and a specific surface area of 1 to 100 m$^2$/g, preferably 5 to 50 m$^2$/g, still preferably 7 to 40 m$^2$/g. The non-magnetic powder preferably has a crystallite size of 0.01 to 2 µm, a DBP oil absorption of 5 to 100 ml/10 g, preferably 10 to 80 ml/100 g, still preferably 20 to 60 ml/100 g, and a specific gravity of 1 to 12, preferably 3 to 6. The particle shape may be any of acicular, spherical, polygonal and tabular shapes.

The soft magnetic powder includes Fe powder, Ni, magnetite powder, Fe—Si, Fe—Al, Fe—Ni, Fe—Co, Fe—Co—Ni, Fe—Al—Co (Sendust), Mn—Zn ferrite, Ni—Zn ferrite, Mg—Zn ferrite, Mg—Mn ferrite, and those described in Chikazumi Soushin, *Kyoujiseitai no butsuri* (1st vol.) *Jikitokusei to ohyo*, shokabo (1984), 368–376. The nonmagnetic powder and the soft magnetic powder is preferably pretreated so that at least part of the particle surface may be coated with $Al_2O_3$, $siO_2$, $TiO_2$, $ZrO_2$, $SnO_2$, $Sb_2O_3$ or ZnO to have improve dispersibility. $Al_2O_3$, $SiO_2$, $TiO_2$ and $ZrO_2$ are preferred coating compounds for their dispersibility improving effect. $Al_2O_3$, $SiO_2$, and $ZrO_2$ are particularly preferred. These coating compounds can be used either individually or as a combination thereof. According to the purpose, a composite coating layer can be formed by co-precipitation or a method comprising first applying alumina to the non-magnetic or soft magnetic particles and then treating with silica or vise versa. The surface coating layer may be porous for some purposes, but a homogeneous and dense layer is generally preferred.

Carbon black can be incorporated into the lower layer to reduce surface resistivity Rs and also to obtain a desired micro Vickers hardness. The carbon black added to the lower layer usually has an average particle size of 5 to 80 nm, preferably 10 to 50 nm, still preferably 10 to 40 nm. Examples of useful carbon black species are the same as those described supra for use in the backcoating layer.

The magnetic powder which can be used in the lower layer includes $\gamma$-$Fe_2O_3$, Co-doped $\gamma$-$Fe_2O_3$, $\alpha$-Fe-based alloys, and $CrO_2$. The magnetic substance for use in the lower layer is chosen according to the purpose. The effects of the present invention are independent of the kind of the magnetic substance. As is known, the upper magnetic layer and the lower magnetic layer can have their performance varied according to the purpose. For instance it is desirable to design the lower magnetic layer to have lower coercivity (Hc) than the upper magnetic layer in order to improve longer wavelength recording characteristics. It is effective for the same purpose to design the lower magnetic layer to have higher remanence (Br) than the upper magnetic layer. In addition to what has been described, known multi-layer configurations are applicable to the magnetic recording tape of the invention to enjoy contemplated advantages. Binders, solvents, additives (e.g., lubricants and dispersants), methods of dispersing, and the like that have been described with respect to the upper magnetic layer are applicable to the lower magnetic or non-magnetic layer. In connection of the amounts and the kinds of the binder and the additives, in particular, known techniques relating to a magnetic layer are applicable.

The flexible non-magnetic supports which can be used in the invention include biaxially stretched polyethylene naphthalate (PEN), polyethylene terephthalate (PET), polyamide, polyamide-imide, aromatic polyamide, and polybenzobisoxazole. If desired, the flexible support may be subjected to pretreatments, such as corona discharge treatment, plasma treatment, adhesion promoting treatment, and heat treatment. It is desirable for the non-magnetic support to have such high surface smoothness as has a center-line average roughness (Ra) of 0.1 to 20 nm, preferably 1 to 10 nm, with a cut-off length of 0.25 mm. It is also desirable for the support to be free from giant projections of 1 $\mu$m or greater. The thickness of the support usually ranges 4 to 15 $\mu$m, preferably 4 to 9 $\mu$m. Where in using a thin support, the backcoating layer roughness is easily transferred under handling tension. This is effectively prevented by using the above-mentioned polyurethane resin in a top coat. In designing a 7 $\mu$m or thinner support, it is advisable to use a PEN film or an aromatic polyamide (e.g., Aramid) film as a support. An Aramid film is the best.

The magnetic recording medium of the invention is typically produced by coating a running non-magnetic support with a coating composition either by evaporation or wet coating so as to give a dry thickness falling within the above-recited range. A plurality of coating compositions, whether magnetic or non-magnetic, may be applied successively or simultaneously. Coating equipment includes an air doctor (air knife) coater, a blade coater, a rod coater, an extrusion coater, a squeegee coater, an impregnation coater, a reverse roll coater, a transfer roll coater, a gravure coater, a kiss roll coater, a cast coater, a spray coater, and a spin coater. For the details of coating techniques using these coaters, reference can be made in *Saishin Coating Gijyutsu*, published by Sogo Gijyutsu Center, May 31, 1983.

The magnetic recording tape having a multilayer structure is preferably produced by the following coating methods.

(a) A method comprising applying a coating composition for lower layer by using a coating apparatus generally employed for a magnetic coating composition, such as a gravure coater, a roll coater, a blade coater or an extrusion coater, and then applying a coating composition for upper layer while the lower layer is wet by means of an extrusion coating apparatus disclosed in JP-B-1-46186 and JP-A-60-238179, which is of the type in which a support is pressed while coated.

(b) A method in which a lower layer and an upper layer are applied almost simultaneously through a single coating head disclosed in JP-A-63-88080, JP-A-2-17971, and JP-A-2-265672, the coating head having two slits through which the respective coating liquids pass.

(c) A method in which a lower layer and an upper layer are applied almost simultaneously by means of an extrusion coating apparatus disclosed in JP-A-2-174965, the apparatus being equipped with a back-up roll.

The magnetic layer thus applied is treated in a magnetic field to orient the ferromagnetic particles and then dried. Magnetic orientation treatment can be carried out in a known manner. The magnetic layer is smoothened with super calendering rolls, etc., whereby voids generated by evaporation of the solvent are eliminated to improve the packing density of the ferromagnetic powder in the magnetic layer, which leads to high electromagnetic characteristics. Calendering rolls can be of heat-resistant plastics, such as epoxy resins, polyimide, polyamide, and polyamide-imide, or metals.

It is desirable for the magnetic recording tape to have a smooth surface. To obtain a smooth surface, it is effective to calender a magnetic layer formed by using a specifically selected binder resin as described above. Calendering is carried out at a calender roll temperature of 60 to 100° C., preferably 70 to 100° C., still preferably 80 to 100° C., under a pressure of 100 to 500 kg/cm (98 to 490 kA/m), preferably 200 to 450 kg/cm (196 to 441 kA/m), still preferably 300 to 400 kg/cm (294 to 392 kA/m). The resulting magnetic recording medium is slit into tapes of desired width with a slitter, etc.

A calendered film is usually subjected to heat treatment. Today, weight is put on reduction in thermal shrinkage of magnetic recording tape in order not to impair tape linearity (to maintain off-track margin). In view of the decreasing track width, it is demanded to reduce MD (longitudinal direction) thermal shrinkage in an environment of use to 0.07% or less. Means for reducing thermal shrinkage includes a method in which a tape in web form is heated while handling under low tension and a method in which a tape wound on a hub (e.g., a bulk roll or a tape pack in a cassette) is bulk-heated. The former treatment involves less possibility of the backcoating layer surface roughness imprinting itself on the magnetic layer but is less effective in largely reducing thermal shrinkage. For example, the thermal shrinkage percentage of the resulting tape is 0.1 to 0.12% at the lowest when exposed at 70° C. for 48 hours, while somewhat depending on the annealing time, the retention time, the tape thickness, and the handling tension. On the other hand, the latter bulk heat treatment achieves marked reduction in thermal shrinkage but causes the backcoating layer to imprint its surface roughness in the magnetic layer, which can result in output reduction and noise increase.

While it is preferred that the heat treatment for cupping the magnetic recording tape be performed in place of the above-mentioned bulk heat treatment for thermal shrinkage reduction, both the heat treatment for cupping and the bulk-heat treatment for thermal shrinkage reduction may be conducted.

According to the present invention, layers can be designed to have high elasticity and less susceptibility to plastic deformation. In particular, even where bulk heat treatment for thermal shrinkage reduction is involved, a high output and low noise magnetic recording tape can be obtained. This effect is especially remarkable where the aforementioned polyurethane resin is used as a binder resin. When heated at 70° C. for 48 hours, the magnetic recording tape of the invention shows a thermal shrinkage percentage of 0.12% or lower in the MD. The MD thermal shrinkage percentage is measured as follows. An 8 mm wide tape is cut with a 10 cm length to prepare a specimen. The specimen is suspended with a 0.2 g load applied to its end and kept in an atmosphere of 70° C. for 48 hours. The change in specimen length after heating is divided by the initial length (10 cm), and the quotient is multiplied by 100 to give a thermal shrinkage percentage (%).

According to the invention, since the backcoating layer can be made smooth, and moderate outward cupping can be imparted to the tape, it is possible to properly control the frictional coefficient of the backcoating layer while helping entrapped air escape quickly during winding. Since the backcoating layer and the magnetic layer hardly slip with each other during winding, the coated film or slit film (i.e., tape) can be wound evenly onto a core, a hub or a reel by high speed handling into a neat roll, pancake or pack. Similarly, the tape can be wound onto a hub or a reel with a good wind quality when fast-forwarded or rewound on a video cassette recorder.

EXAMPLES

The present invention will now be illustrated in greater detail with reference to Examples, but it should be understood that the present invention is not deemed to be limited thereto. All the parts given in Tables are by weight.

Example 1

The (a) components shown in Table 1 were mixed in an open kneader and dispersed in a sand mill. The (b) component of Table 1 was added to the dispersion. The (c) component was added thereto. The resulting mixture was filtered through a filter having an average pore size of 1 μm to prepare a coating composition for magnetic layer.

The (d) components shown in Table 2 were mixed in an open kneader and dispersed in a sand mill. The (e) component of Table 2 was added to the dispersion. The (f) component was added thereto. The resulting mixture was filtered through a filter having an average pore size of 1 μm to prepare a coating composition A for non-magnetic layer.

The (g) components shown in Table 3 were mixed in an open kneader and dispersed in a sand mill. The (h) components of Table 3 were added to the dispersion. The mixture was filtered through a filter having an average pore size of 1 S to prepare a coating composition A for backcoating layer.

The coating composition for non-magnetic layer was applied to a 5.2 μm thick polyethylene naphthalate film (Ra on magnetic layer side: 1.4 nm; Ra on backcoating layer side: 3 nm) to a dry thickness of 1.5 μm. Immediately thereafter, the coating composition for magnetic layer was applied thereon to a dry thickness of 0.07 μm. While the applied coating composition for magnetic layer was wet, it was magnetically oriented with a magnet of 300 mT, followed by drying. The coating composition A for backing layer was applied to the opposite side of the film support to a dry thickness of 0.5 μm and dried. The coated film was passed through six pairs of metal rolls in a 7-roll calender (speed: 100 m/min; linear pressure: 300 kg/cm (294 kN/m); temperature: 90° C.) and slit into half-inch widths, each of which was wound onto a hub and heat treated at 70° C. for 24 hours to obtain a magnetic recording tape.

TABLE 1

| | Component | Amount (part) |
|---|---|---|
| a | ferromagnetic metal powder*[1] | 100 |
| | polyurethane resin A*[2] | 18 |
| | phenylphosphonic acid | 5 |
| | α-$Al_2O_3$ (avg. particle size: 0.15 μm) | 10 |
| | carbon black (avg. particle size: 80 nm) | 0.5 |
| | butyl stearate | 1 |
| | stearic acid | 1 |
| | MEK | 120 |
| | Cyclohexanone | 60 |
| b | polyisocyanate*[3] | 5 |
| c | MEK/cyclohexanone (1/1 (by weight)) | 40 |

Note:
*[1]Fe/Co (atomic ratio = 100/30), Fe/Al (atomic ratio = 100/11); Hc: 192 kA/m (2430 Oe); crystallite size: 11 nm; saturation magnetization σs: 110 A-$m^2$/kg; average particle length: 0.045 μm; average acicular ratio (arithmetic mean): 5.5
*[2]Mn: 36000; Tg: 94° C.; —$SO_3Na$ content: 6 μeq/g; synthesized from the following components:
Hydrogenated bisphenol A: 0.6 mol
Bisphenol A-propylene oxide adduct: 0.3 mol
Sodium bis(2-hydroxyethyl) isophthalate 5-sulfonate: 0.05 mol
diphenylmethane diisocyanate: 1.0 mol
Trimethylolpropane: 0.05 mol
*[3]Coronate L, available from Nippon Polyurethane Industry Co., Ltd.

TABLE 2

| | Component | Amount (part) |
|---|---|---|
| d | acicular hematite*[4] | 80 |
| | polyurethane resin A*[2] | 20 |
| | phenylphosphonic acid | 5 |
| | α-$Al_2O_3$ (avg. particle size: 0.15 μm) | 10 |
| | carbon black (avg. particle size: 16 nm)*[5] | 20 |
| | butyl stearate | 1 |
| | stearic acid | 1 |
| | MEK | 120 |
| | Cyclohexanone | 80 |
| e | polyisocyanate*[3] | 5 |
| f | MEK/cyclohexanone (1/1 (by weight)) | 40 |

*[4]Average length: 0.15 μm; average acicular ratio: 8; $S_{BET}$: 52 $m^2$/g; surface coating compound: $Al_2O_3/SiO_2$
*[5]DBP oil absorption: 120 ml/100 g; pH: 8; $S_{BET}$: 250 $m^2$/g

TABLE 3

| | Component | Amount (part) |
|---|---|---|
| g | acicular hematite*[4] | 80 |
| | polyurethane resin B*[6] | see Table 4 |

TABLE 3-continued

| Component | Amount (part) |
|---|---|
| Nitrocellulose | see Table 4 |
| phenylphosphonic acid | 5 |
| α-Al$_2$O$_3$ (avg. particle size: 180 nm) | 5 |
| carbon black (avg. particle size: 16 nm)*[5] | 20 |
| carbon black (avg. particle size: 80 nm) | 0.5 |
| stearic acid | 3 |
| MEK | 120 |
| Cyclohexanone | 120 |
| h  Polyisocyanate*[3] | 5 |
| MEK/cyclohexanone (1/1 (by weight)) | 80 |

*[6]Mn: 45000; Tg: 105° C.; —SO$_3$Na content: 6 μeq/g; synthesized from the following components:
Hydrogenated bisphenol A: 0.5 mol
Bisphenol A-propylene oxide adduct: 0.4 mol
Sodium bis(2-hydroxyethyl) isophthalate 5-sulfonate: 0.05 mol
diphenylmethane diisocyanate: 1.0 mol
Trimethylolpropane: 0.05 mol

Examples 2 and 3 and Comparative Examples 1 and 2

Magnetic recording tapes were prepared in the same manner as in Example 1, except that the amounts of the carbon black having an average particle size of 80 nm and the nitrocellulose resin used in the backcoating layer and the average length of the acicular hematite powder used in the backcoating layer were changed as shown in Table 4. In Comparative Example 1, a vinyl chloride resin (MR110, available from Zeon Corp.) was used in place of the nitrocellulose resin.

The magnetic recording tapes obtained in Examples and Comparative Examples were evaluated as follows. The results obtained are shown in Table 4.

1) C/N Ratio

The tape was tested on a drum tester equipped with a metal-in-gap (MIG) writing head (gap: 0.15 μm; track width: 18 μm; 1.8T) and a shielded magnetoresistive (MR) reading head (shield-to-shield spacing: 0.2 μm; track width: 4 μm). Single frequency signals having a recording wavelength of 0.2 μm (50 MHz) were recorded at a head/media relative velocity of 10 m/sec. The reproduced signals were analyzed with a spectrum analyzer supplied by ShibaSoku Co., Ltd. The ratio of the output voltage of the single frequency signals to the noise voltage at a frequency 1 MHz apart from the single frequency is taken as a C/N (dB). In reading, a bias current was applied to the MR head so as to give maximum output.

2) Tape Pack Conditions

The tape (600 m long) was wound in a linear tape-open (LTO) Ultrium-1 cartridge and recorded over the whole length on an LTO Ultrium drive (supplied by IBM) at a transfer speed of 5 m/sec. The edge of the rewound tape pack was inspected to count the number of popped strands.

3) Storage Characteristics

The error rate of the recorded tape (before storage) was measured on the same drive as used in (2) above. The cartridge was allowed to stand at 60° C. and 90% RE for one week and then played back again to measure the error rate. Occurrence of up to several errors per mega bit is acceptable for practical use.

4) Projection Density

The number of projections of 50 to 100 nm in height and projections exceeding 100 nm and less than 500 nm in height per 90 μm side square of the backcoating layer surface were counted with a tapping mode AFM. The projection height was defined to be a distance from a center plane, a reference plane decided so that the total volumes between the plane and the measured profile may be the same above and below the plane and be the least.

TABLE 4

| | Example 1 | Example 2 | Example 3 | Comp. Example 1 | Comp. Example 2 | Comp. Example 3 |
|---|---|---|---|---|---|---|
| Backcoating layer Projection Density (/90 μm side sq.) | | | | | | |
| Height: 50–100 nm | 45 | 180 | 15 | 230 | 5 | 15 |
| Height: >100 nm, ≦500 nm | 2 | 7 | 1 | 18 | 0 | 1 |
| Carbon Black (80 nm) Content in Backcoating layer (part) | 0.5 | 3 | 0.5 | 10 | 0 | 0.5 |
| Avg. Length (nm) of Acicular Hematite | 150 | 200 | 100 | 250 | 70 | 100 |
| Polyurethane Resin B Content in Backcoating layer (part) | 20 | 23 | 15 | 10 | 0 | 0 |
| Nitrocellulose Resin Content in Backcoating layer (part) | 5 | 2 | 10 | 15* | 35 | 50 |
| Cupping (%) | 7.9 | 3.8 | 18 | 1.8 | 19 | 35 |
| C/N (dB) | 2.9 | 2.9 | 3.3 | 0 | 3.8 | 3.2 |
| Number of Popped Strands in Tape Pack | 0 | 0 | 1 | 35 | 0 | 0 |
| Error Rate (×10$^{-6}$) | | | | | | |
| Before Storage | 0.58 | 0.87 | 0.45 | 82 | 380 | 0.28 |
| After Storage | 0.86 | 1.10 | 0.90 | 6000 | 8500 | unmeasurable |

Note:
*Vinyl chloride resin was used in place of nitrocellulose resin.

The results in Table 4 prove that the magnetic recording tapes of Examples achieve high C/N, exhibit good wind quality with reduced popped strands, and have a low error rate before storage and a suppressed increase in error rate after storage indicative of satisfactory archival stability. In contrast, the tapes of Comparative Examples 1 and 2 have a high error rate before storage and undergo a remarkable increase in error rate due to storage. In addition, the tape of Comparative Example 1 has poor wind quality, resulting in an uneven pack with many popped strands. The tapes of Comparative Examples 2 and 3 achieve high C/N ratios, which owes to the measurement made on a sample on a drum tester but not on a running tape. Although the tape of Comparative Example 3 is satisfactory in error rate before storage, it suffered from further cupping by storage, and the heat contact was too unstable to measure the error rate after storage.

The present invention provides a superior magnetic recording tape for high density recording by controlling the projection density on the backcoating layer and the degree of outward cupping of the tape. The magnetic recording tape of the invention is free from the roughness imprint problem occurring in a tape pack, exhibits improved wind quality, and achieves a high C/N ratio and a low error rate.

This application is based on Japanese Patent application JP 2002-177338, filed Jun. 18, 2002, the entire contents of those are incorporated by reference, the same as if set forth at length.

What is claimed is:

1. A magnetic recording tape comprising a magnetic layer, a flexible support and a backcoating layer in this order, wherein the backcoating layer has on its surface 10 to 200 projections having a height of 50 to 100 nm per 90 μm side square as measured with an atomic force microscope and 10 or fewer projections having a height greater than 100 nm and not greater than 500 nm per 90 μm side square as measured with an atomic force microscope, and the tape has a cupping of 3 to 20% of the tape width with convexity on the magnetic layer side.

2. The magnetic recording tape according to claim 1, wherein the tape has a cupping of 4 to 15% of the tape width.

3. The magnetic recording tape according to claim 1, which further comprises a non-magnetic layer comprising a non-magnetic inorganic powder and a binder so that the magnetic layer, the non-magnetic layer and the flexible support are in this order.

4. The magnetic recording tape according to claim 1, wherein the backcoating layer comprises a binder and a non-magnetic powder dispersed in the binder.

5. The magnetic recording tape according to claim 4, wherein the non-magnetic powder comprises at least one selected from the group consisting of carbon black, a metal powder, an organic filler and a metal oxide.

6. The magnetic recording tape according to claim 4, wherein the non-magnetic powder comprises a metal oxide.

7. The magnetic recording-tape according to claim 6, wherein the metal oxide is selected from the group consisting of titanium oxide, α-iron oxide, goethite, $SiO_2$, $SnO_2$, $WO_3$, $Al_2O_3$, $ZrO_2$ and ZnO.

8. The magnetic recording tape according to claim 4, wherein the non-magnetic powder comprises carbon black.

9. The magnetic recording tape according to claim 8, wherein the carbon black has an average particle size of 50 nm or smaller.

10. The magnetic recording tape according to claim 8, wherein the carbon black has an average particle size of 10 to 40 nm.

11. The magnetic recording tape according to claim 4, wherein the non-magnetic powder comprises a metal oxide and carbon black.

12. The magnetic recording tape according to claim 1, wherein the backcoating layer comprises a lubricant having a melting point of 80° C. or lower.

13. The magnetic recording tape according to claim 1, wherein the backcoating layer comprises a lubricant having a melting point of −20 to 80° C.

14. The magnetic recording tape according to claim 1, wherein the backcoating layer has a glass-transition temperature of 80 to 180° C.

* * * * *